US011587239B2

(12) United States Patent
Baumbach et al.

(10) Patent No.: US 11,587,239 B2
(45) Date of Patent: Feb. 21, 2023

(54) TECHNIQUES FOR INFERRING THE CONFIGURATION OF A ROOM FROM SKELETON TRACKING

(71) Applicant: DISNEY ENTERPRISES, INC., Burbank, CA (US)

(72) Inventors: Elliott Baumbach, Los Angeles, CA (US); Michael Goslin, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 169 days.

(21) Appl. No.: 16/354,094

(22) Filed: Mar. 14, 2019

(65) Prior Publication Data

US 2020/0294247 A1 Sep. 17, 2020

(51) Int. Cl.
| | |
|---|---|
| G06T 7/246 | (2017.01) |
| G06N 5/04 | (2006.01) |
| G06T 15/00 | (2011.01) |
| G06V 40/16 | (2022.01) |

(52) U.S. Cl.
CPC ............. *G06T 7/246* (2017.01); *G06N 5/04* (2013.01); *G06T 15/00* (2013.01); *G06V 40/168* (2022.01); *G06T 2200/04* (2013.01); *G06T 2200/08* (2013.01)

(58) Field of Classification Search
CPC ..... G06T 7/246; G06T 15/00; G06T 2200/04; G06T 2200/08; G06K 9/00268; G06N 5/04

USPC ......................................................... 382/103
See application file for complete search history.

(56) References Cited

U.S. PATENT DOCUMENTS

| | | | |
|---|---|---|---|
| 8,639,020 B1* | 1/2014 | Kutliroff ................. | G06K 9/00 382/154 |
| 2011/0293137 A1* | 12/2011 | Gurman .................. | G06T 15/00 382/103 |
| 2013/0090133 A1* | 4/2013 | D' Jesus Bencci ... | H04W 4/029 455/456.2 |
| 2019/0012832 A1* | 1/2019 | Sun ........................ | G06T 19/003 |

OTHER PUBLICATIONS

Gong, "Human Pose Estimation from Monocular Images: A Comprehensive Survey" MDPI-Sensors 2016 (Year: 2016).*

(Continued)

*Primary Examiner* — Mark Roz
(74) *Attorney, Agent, or Firm* — Artegis Law Group, LLP

(57) ABSTRACT

In various embodiments, a map inference application automatically maps a user space. A camera is positioned within the user space. In operation, the map inference application determines a path of a first moving object within the user space based on a tracking dataset generated from images captured by the camera. Subsequently, the map inference application infers a walking space within the user space based on the path. The map inference application then generates a model of at least a portion of the user space based on the walking space. One or more movements of a second object within the user space are based on the model. Advantageously, unlike prior art solutions, the map inference application enables a model of a user space to be automatically and efficiently generated based on images from a single stationary camera.

23 Claims, 3 Drawing Sheets

(56) References Cited

OTHER PUBLICATIONS

Elhayek "Fully Automatic Multi-person Human Motion Capture for VR Applications" ICVRAR Sep. 2018 (Year: 2018).*
Gordon ("2012 anthropometric survey of u.s. army personnel: Methods and summary statistics" Natick/TR-15/007 2014) (Year: 2014).*

* cited by examiner

TECHNIQUES FOR INFERRING THE CONFIGURATION OF A ROOM FROM SKELETON TRACKING

BACKGROUND

Field of the Various Embodiments

Embodiments of the present invention relate generally to computer science and navigation technology and, more specifically, to techniques for inferring the configuration of a room from skeleton tracking.

Description of the Related Art

In some advanced gaming applications, a user interacts with a transformed version of the room in which the user is located. For example, an adventure gaming application could provide a virtual reality ("VR") forest in which the carpet of the room is replaced with a virtual forest floor and items in the room, such as a desk and a chair, are replaced with virtual trees in the virtual forest. The adventure gaming application could position some virtual objects in locations that are accessible to the user and other virtual objects in locations that are inaccessible to the user (e.g., above a 7 ft high floor lamp). To properly transform the room, the gaming application requires a model of the room.

In one approach to generating a model of a room, the user holds a camera and manually points the camera at different areas in the room while slowly rotating the camera horizontally and vertically and/or walking around the room. Subsequently, an image-based room modeling application creates a model of the room based on the images from the camera. The resulting model usually includes a set of surface areas representing the walls, floors, and different objects in the room. One drawback of generating a model of a room using a hand-held camera is that physically moving the camera around the room is time-consuming, tedious, and error-prone. In particular, if the user neglects to look at every surface and feature of the room, then the gaming application could inadvertently cause the user to collide with an object in the room. For example, if the user neglects to point the camera at a floor lamp, then the gaming application could generate a virtual trail that traverses over the floor lamp. As a result, the user could collide with the floor lamp while walking along the virtual trail during gameplay.

In another approach to generating a model of a room, a scanning Light Detection and Ranging ("LIDAR") device is used to generate a dataset of detected surface points in the room. A scanning LIDAR device typically spins at a very high frequency to detect surface points in a 360-degree circle around the device. Subsequently, a LIDAR-based room modeling application creates a model of the room based on the dataset of detected surface points. One drawback of generating a model of a room using scanning LIDAR is that these types of devices are reasonably expensive, so ordinary users may not have these types of devices or want to purchase these types of devices. Further, the amount of computing resources needed to process and store the dataset of detected surface points generated by scanning LIDAR devices can oftentimes exceed the amount of computing resources typically available to ordinary users.

As the foregoing illustrates, what is needed in the art are more effective techniques for mapping rooms when using advanced gaming applications.

SUMMARY

One embodiment of the present invention sets forth a computer-implemented method for mapping a user space. The method includes determining a path of a first moving object within the user space based on a tracking dataset generated from images captured by a camera positioned within the user space; inferring a walking space within the user space based on the path; and generating a model of at least a portion of the user space based on the walking space, where one or more movements of a second object within the user space are based on the model.

At least one technical advantage of the disclosed techniques relative to the prior art is that the disclosed techniques enable a model of a room to be automatically and efficiently generated based on images from a single stationary camera. Notably, unlike prior art camera-based approaches to room mapping, with the disclosed techniques, a person is not required to manually move a hand-held camera around the room in a time-consuming and error-prone image capturing process. Further, lesser amounts of computing resources are required to implement the disclosed techniques relative to the computing resources typically needed to implement prior art LIDAR-based approaches to room mapping. These technical advantages represent one or more technological advancements over the prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Room Mapping System Overview

Figure 1:
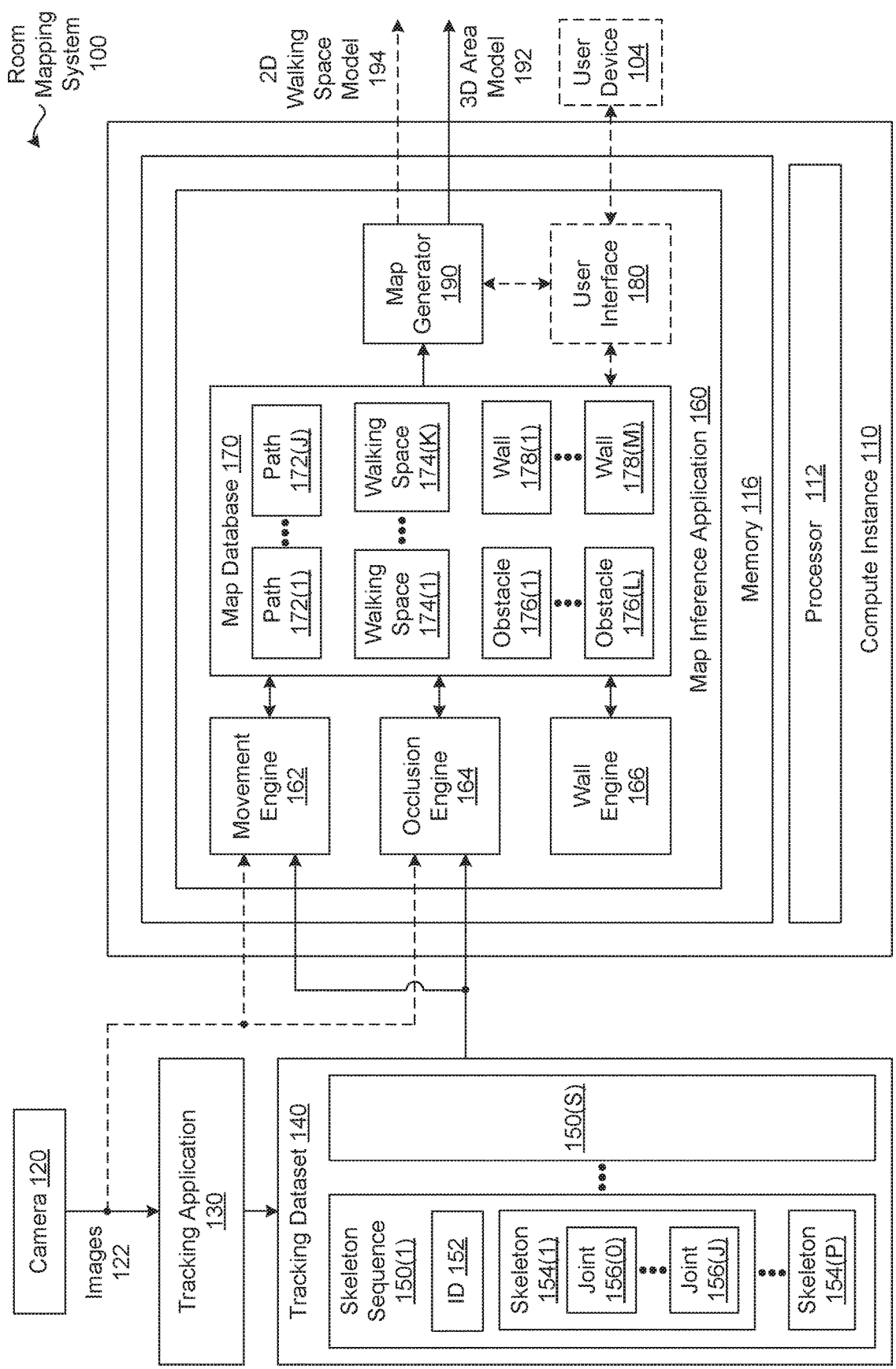
FIG. 1 is a conceptual illustration of a room mapping system configured to implement one or more aspects of the present invention.

FIG. 1 is a conceptual illustration of a room mapping system 100 configured to implement one or more aspects of the present invention. As shown, the room mapping system 100 includes, without limitation, a compute instance 110, a camera 120, a tracking application 130, and a tracking dataset 140. In alternate embodiments, the room mapping system 100 may include any number and types of any of the compute instance 110, the camera 120, the tracking application 130, and the tracking dataset 140 in any combination. For explanatory purposes, multiple instances of like objects are denoted with reference numbers identifying the object and parenthetical numbers identifying the instance where needed. In some embodiments, any number of the components of the room mapping system 100 may be distributed across multiple geographic locations or included in one or more cloud computing environments (i.e., encapsulated shared resources, software, data, etc.) in any combination.

As shown, the compute instance 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("GPU"), a controller, a microcontroller, a state machine, or any combination thereof.

The memory 116 stores content, such as software applications and data, for use by the processor 112 of the compute instance 110. The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory ("CD-ROM"), an optical storage device, a magnetic storage device, or any suitable combination of the foregoing.

In alternate embodiments, each of any number (including one) of the compute instances 110 may include, without limitation, any number of processors 112 and any number of memories 116 in any combination. In particular, any number of the compute instances 110 may provide a multiprocessing environment in any technically feasible fashion.

In general, the compute instance 110 is configured to implement one or more applications. Each application is described as residing in the memory 116 of a single compute instance 110 and executing on a processor 112 of the single compute instance. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

In particular, the compute instance 110 is configured to map an area, such as a room. As described previously herein, in one conventional approach to mapping a room, an image-based room modeling application creates a model of the room based on the images from a hand-held camera. One drawback of mapping a room using a hand-held camera is that physically moving the camera around the room is time-consuming, tedious, and error-prone. In another conventional approach to mapping a room, a LIDAR-based room modeling application creates a model of the room based on a dataset of detected surface points received from a scanning LIDAR device. One drawback of generating a model of a room using scanning LIDAR is that these types of devices are reasonably expensive, so ordinary users may not have these types of devices or want to purchase these types of devices. Further, the amount of computing resources needed to process and store the dataset of detected surface points generated by scanning LIDAR devices can oftentimes exceed the amount of computing resources typically available to ordinary users.

Automatically Mapping a Room Based on Tracking Data

To address the above problems, the compute instance 100 includes, without limitation, a map inference application 160. The map inference application 160 resides in the memory 116 and executes on the processor 112 of the compute instance 110. In general, the map inference application 160 infers the configuration of a user space based on the movement of objects in the user space. For instance, in some embodiments, the map inference application 160 infers the configuration of a room based on the movement of people and pets in the room.

In operation, the camera 120 generates images 122 of an area surrounding the camera 122. The area that is within the field of view of the camera 120 is referred to herein as the "user space." The camera 120 may be any type of camera that is capable of generating any number and type of images 122 that visually capture motion. For example, the camera 120 may be a video camera or a still camera. Notably, the camera 120 may have a fixed position and/or a fixed orientation. In alternate embodiments, the room mapping system 100 may include any number and types of the cameras 120 in any combination, and the techniques described herein are modified accordingly. For example, the room mapping system 100 could include any number (including one) of the cameras 120, where each of the cameras 120 is a security camera that is in a fixed position and orientation.

The tracking application 130 receives the images 122 (from any number of the cameras 120) and periodically generates a new tracking dataset 140. The tracking application 130 may reside and execute on any number and type of compute instances 110 in any combination. In some embodiments, both the map inference application 160 and the tracking application 130 reside in the memory 166 and execute on the processor 112 of the same compute instance 110. In alternate embodiments, any portion of the functionality of the tracking application 130 may be implemented in the map inference application 160. In some such embodiments, the tracking application 130 may be omitted from the room mapping system 100.

Each of the tracking datasets 140 is associated with a specific period in time and the tracking application 130 may generate a new tracking dataset 140 based on any number and type of criteria. For instance, in some embodiments, the tracking application 130 may generate a new tracking dataset 140 every sixty minutes based on the images 122 received from the camera 120 over the previous sixty minutes. In the same or other embodiments, the tracking application 130 may generate a new tracking dataset 140 on-demand, based on a request received via an application programming interface ("API") (not shown). The tracking application 130 performs, without limitation, any number and type of image processing, image recognition, and/or motion detection operations on the images 122 to generate the tracking dataset 140.

As shown, the tracking dataset 140 includes, without limitation, any number of skeleton sequences 150. Each of the skeleton sequences 150 represents a different object and includes, without limitation, an identifier ("ID") 152 and any number of skeletons 154. Notably, each of the skeleton sequences 150 may represent a different type of object. The identifier 152($i$) distinguishes the object represented by the skeleton sequence 150($i$) in any technically feasible fashion.

For example, if two different people and a dog were moving in the user space during the period of time associated with the tracking dataset 140, then the tracking dataset 140 would include three skeleton sequences 150(1)-150(3). The skeleton sequence 150(1) could represent a first person and include the identifier 152(1) of "5," the skeleton sequence 150(2) could represent a dog and include the identifier 152(2) of "8," and the skeleton sequence 150(3) could represent a second person and include the identifier 152(3) of "2."

Each of the skeletons 154 includes, without limitation, any number of joints 156. Each of the joints 156 specifies position information for a different physical joint associated with an object in any technically feasible fashion. For in some embodiments, if the skeleton 154(1) represents a complete person, then the skeleton 154(1) includes the twenty joints 156(1)-156(20), where each of the joints 156 specifies position information for a different physical joint in a human skeleton. Some examples of physical joints are a neck joint, a head joint, a left shoulder joint, a right shoulder joint, a left thumb joint, a right thumb joint, a hip joint, a left knee joint, a right knee joint, a left foot joint, a right foot joint, etc. The skeleton 154 is also referred to herein as "the skeleton object."

Each of the joints 156 may specify any amount and type of position information in any technically feasible fashion. For instance, in some embodiments, each of the joints 156 may specify three-dimensional ("3D") coordinates (x, y, z) relative to the camera 120. From the point-of-view of the camera 120, a positive value for x may specify a distance to the left of the camera 120, a negative value for x may specify a distance to the right of the camera 120, a positive value for y may specify a distance above the camera 120, a negative value for y may specify a distance below the camera 120, and a positive value for z may specify a distance in front of the camera 120. In other embodiments, each of the joints 156 may specify two-dimensional ("2D") coordinates (x, y) relative to the camera 120. In alternate embodiments, each of the joints 156 and/or each of the skeletons 154 may specify any amount and type of orientation information in any technically feasible fashion in addition to any amount of position information.

As shown, the map inference application 160 generates a 3D area model 192 and/or a 2D walking space model 184 based on the tracking dataset 140 and, optionally, the images 122. In some embodiments, the map inference application 160 receives the tracking dataset 140 from the tracking application 130 and the images 122 from the camera 120. In alternate embodiments, the map inference application 160 may acquire the tracking dataset 140 in any technically feasible fashion. For instance, in some embodiments, the room mapping system 100 omits the tracking application 130 and the map inference application 160 generates the tracking dataset 140 based on the images 122.

The map inference application 160 includes, without limitation, a map database 170, a movement engine 162, an occlusion engine 164, a wall engine 166, and a map generator 190. The map database 170 includes, without limitation, any number of paths 172, any number of walking spaces 174, any number of obstacles 176, and any number of walls 178. Each of the paths 172 represents the movement of an object along a walking plane in the tracked space. Each of the walking spaces 174 represent an inferred area within which objects (e.g., people, dogs, automated vacuum cleaners) can move without obstruction. Each of the obstacles 176 represents an inferred object that restricts the movement of other objects. Some examples of obstacles include a desk, a floor lamp, a table, a sofa, etc. Each of the walls 178 represents an inferred outer edge of the tracked space.

Initially, the map inference application 160 generates an "initial" map database 170 that includes no paths 172, no walking spaces 174, no obstacles 176, and no walls 178. The map inference application 160 then sequentially receives any number of tracking datasets 140 and/or images 122. Upon receiving the tracking dataset 140, the map inference application 160 may perform, without limitation, any number and type of image processing, image recognition, and/or motion detection operations on the tracking dataset 140 and/or the images 122 to generate any additional position and/or orientation information associated with any number of moving objects.

For instance, in some embodiments, if each of the joints 156 in the skeleton 154 specifies 2D coordinates, then the map inference application 160 may compute a z coordinate for each of the joints 156 included in the skeleton 154 based on the size (i.e., height and or width) of the associated skeleton 154. In the same or other embodiments, the map inference application 160 may compute 3D coordinates specifying the location of the center of the skeleton 154(x) and/or the location of one or more of the joints 156 included in the skeleton 154(x) based on the 2D coordinates for the joints 156 and the size of the skeleton 154(x).

Subsequently, for each of the skeleton sequences 150 included in the tracking dataset 140, the movement engine 162 generates a corresponding path 172 and adds the path to the map database 170. The movement engine 162 may generate the path 172 in any technically feasible fashion. For instance, in some embodiments, the movement engine 162 determines a trajectory of a moving object along a walking plane based on the evolution of the joints 156 associated with the lowest extremities (e.g., feet, paws, etc) across the skeletons 154 included in the skeleton sequence 150. The movement engine 162 determines a width of the moving object based on the width of the skeletons 154 included in the skeleton sequence 150. The movement engine 162 then generates the path 172 based on the trajectory of the moving object, the walking plane, and the width of the moving object. Finally, the movement engine 162 adds the path 172 to the map database 170.

Subsequently, the movement engine 162 generates any number of walking spaces 174 based on the paths 172 included in the map database 170 and then adds the walking spaces 174 to the map database 170. Notably, the map database 170 includes the paths 172 associated with preceding tracking datasets 140 in addition to the paths 172 associated with the tracking dataset 140. Each of the walking spaces 174 corresponds to a different "frequently traveled" portion of the user space as per the paths 172. The movement engine 162 may define and determine frequently traveled portions of the user space in any technically feasible fashion and based on any amount and type of criteria.

For instance, in some embodiments, the movement engine 162 implements a walking space number (not shown) that specifies a minimum number of the paths 172. The movement engine 162 generates the walking space(s) 174 representing the portions of the user space for which at least the walking space number of the paths 172 overlap. For example, if the walking space number is four and four of the paths 172 overlap the same rectangular portion of the user space, then the movement engine 162 generates the walking space 174 representing the rectangular overlapping area. In another example, if at least the walking space number of the paths 172 are identical, then the movement engine 162 determines that the associated portion of the user space is frequently traveled and sets the walking space 174 equal to the associated portion of the user space.

In a complementary fashion, the movement engine 162 generates any number of obstacles 176 based on the paths 172 included in the map database 170 and then adds the obstacles 176 to the map database 170. First, the movement engine 162 analyzes the paths 172 to determine "avoided" portion(s) of the user space. The movement engine 162 may define and determine avoided portions of the user space in any technically feasible fashion and based on any amount and type of criteria. For instance, in some embodiments, the movement engine 162 determines that any portion of the user space that is not included in at least one of the paths 172 is an avoided portion of the user space. For each avoided portion of the user space, the movement engine 162 generates a different obstacle 176 specifying the avoided portion of the user space.

The occlusion engine 164 generates any number of additional obstacles 176 representing occluding objects based on the tracking dataset 140 and/or the images 122 and then adds the additional obstacles 176 to the map database 170. More precisely, the occlusion engine 164 analyzes the tracking dataset 140 and/or the images 122 to determine whether any portion of any of the moving objects are occluded when traversing through the user space. For each such occlusion, the occlusion engine 164 infers that an occluding object is positioned between the camera 120 and the moving object, and the occlusion engine 164 generates a new obstacle 176 to represent the occluding object. Subsequently, the occlusion engine 164 adds the new obstacles 176 to the map database 170. The occlusion engine 164 may determine occlusions and generate the associated obstacles 176 technically feasible fashion.

For instance, in some embodiments, the occlusion engine 164 analyzes each of the skeleton sequences 150 to determine whether the total number of the joints 156 varies between the skeletons 154 in the skeleton sequence 150. If the total number of the joints 156 varies, then the skeletons 154 having the most joints 156 are referred to herein as "complete" skeletons 154 and the remaining skeletons 154 are referred to herein as "partial skeletons" 154. The occlusion engine 154 then determines the location and size of the occluding object(s) based on the missing joints 156 of the partial skeleton(s) 154. Subsequently, the occlusion engine 154 generates the obstacle 176 that specifies the location and size of the occluding object.

For example, suppose that the skeleton sequence 150 included ten skeletons 150(1)-150(10), each of the skeletons 150(1)-150(6) and 150(8)-150(10) included twenty joints 158 representing an entire human, and the skeleton 150(7) included ten joints 158 representing the upper half of a human. Because the skeleton 150(7) was partial, the occlusion engine 164 would determine that an object was positioned between the person represented by the skeleton 154(7) and the camera 120. The occlusion engine 164 would compute the position and size of the occluding object based on the portion of the skeleton 150(7) that was occluded. More precisely, the occlusion engine 154 would infer the size and location of the occluding object based on the absence of the ten joints 158 representing the lower half of a human. The occlusion engine 154 would then generate a new obstacle 176 representing the size and location of the occluding object.

The wall engine 166 generates any number of the walls 178 based on the paths 172 included in the map database 170. Each of the walls 178 represents a surface area that is approximately perpendicular to the walking plane. The wall engine 166 may infer the walls 178 in any technically feasible fashion. For instance, in some embodiments, the wall engine 166 determines the minimum area that encloses all of the paths 172 and then generates the walls 178 at the edges of the minimum area.

In operation, upon receiving a new tracking dataset 140, the movement engine 162, the occlusion engine 164, and the wall engine 166 update the map database 170 based on the movement of objects within the tracked space. In this fashion, the map inference application 160 continually and automatically improves the quality of the map database 170 over time.

In general, the map generator 190 generates any number of models. In some embodiments, each model may be associated with a different portion of the user space. Each model specifies, without limitation, sizes of, positions of, orientations of, and/or spatial relationships between any number of the walking spaces 174, the walls 178, and the obstacles 176 in any combination and in any technically feasible fashion.

In some embodiments, the map generator 190 generates the 3D area model 192 and/or the 2D walking space model 194 based on the map database 170. The map generator 190 may (re)generate the 3D area model 192 and/or the 2D walking space model 194 in response to any technically feasible trigger. For example, the map generator 190 could be configured to generate the 3D area model 192 and the 2D walking space model 194 at 11 PM daily. Accordingly, as the quality of the map database 170 increases, the quality of the 3D area model 192 and the 2D walking space model 194 also increase.

The map generator 190 may generate the 3D area model 192 in any technically feasible fashion and in any technically feasible computer language or file format. For instance, in some embodiments, the map generator 190 specifies each of the walking spaces 174 as a horizontal surface area, each of the walls 178 as a vertical surface area, and each of the obstacles 176 as a polygon in the extensible markup language ("XML"). In other embodiments, the map generator 190 specifies the walking spaces 174, the walls 178, and the obstacles 176 in a geometry definition file format or a 3D modeling language.

The 2D walking space model 194 represents the walking plane associated with the map database 170. The map generator 190 may generate the 2D walking space model 194 in any technically feasible fashion and in any technically feasible computer language or file format. For instance, in some embodiments, the map generator 190 projects each of the walls 178 and the obstacles 176 onto the walking plane as blockages. The map generator 190 then specifies each of the walking spaces 174 as an available horizontal surface area and each of the walls 178 and the obstacles 176 as a blocked horizontal surface areas in XML, a geometry definition file format, or a 2D modeling language.

The map generator 190 may transmit the 3D area model 192 and/or the 2D walking space model 194 to any number of software applications and/or any number of devices in any technically feasible fashion. The software applications and/or the devices may perform any number and type of operations based on the 3D area model 192 and/or the 2D walking space model 194. Notably, one or more movements of another object (e.g., a person, an inanimate object, etc) within the user space are based on the 3D area model 192 and/or the 2D walking space model 194.

For example, a gaming application could generate a virtual environment based on the 3D area model 192, where the walking spaces 174 are grasslands, the walls 178 are wire fences, and the obstacles 176 are trees. The gaming application could place virtual objects accessible to the user in the grasslands and virtual objects inaccessible to the user at the top of the trees or along the wire fences. In this fashion, the gaming application could guide the movements of the user based on the 3D area model 192. In another example, an automated vacuum cleaner could perform navigation operations based on the 2D walking space model 194. In yet another example, an automatic dog toy could determine trajectories and accessible areas for launching balls based on the 3D area model 192.

Advantageously, the map inference application 160 efficiently generates any number and type of models based on any number and type of cameras 120. Unlike conventional image-based mapping applications, the map inference application 160 can automatically generate accurate models based on the images 122 from a single stationary camera 120. And, as persons skilled in the art will recognize, the amount of data associated with the images 122 and the tracking dataset 140 is typically substantially less than the amount of data associated with a dataset of detected surface points generated by a scanning LIDAR device. Consequently, lesser amounts of computing resources are required to implement the disclosed techniques relative to the computing resources typically needed to implement prior art LIDAR-based approaches to room mapping.

In alternate embodiments, the map inference application 160 may include a user interface 180 that enables a user to interact with the map inference application 160 via a user device 104. The user device 104 may be any type of device that is capable of transmitting input data and/or displaying visual content. For example, the user device 104 could be a game console, a smartphone, a smart television (TV), a laptop, a tablet, or a desktop computer.

In some embodiments, the user interface 180 enables a user to request that the map generator 190 (re)generate the 3D area model 192 and/or the 2D walking space model 194. In the same or other embodiments, the user interface 180 enables a user to request that the map inference application 160 reset the map database 170 to the initial map database 170. Resetting the map database 170 is particularly useful after furniture is moved in the room. In some embodiments, the user interface 180 enables the user to specify how often the map inference application 160 is to regenerate the map database 170, the 3D area model 192, and/or the 2D walking space model 194. In the same or other embodiments, the user interface 180 enables a user to terminate the mapping operations performed by the map inference application 160.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to inferring the configuration of an area based on tracking data derived from images of the area.

For instance, in some embodiments, the tracking application 130 or the map inference application 160 performs face recognition operations to generate facial sequences (not shown) that replace the skeleton sequences 150 in the tracking dataset 140. Each facial sequence captures the movement of the face points of a face over time. The map inference engine 160 infers the movements of objects within the user space based on the facial sequences to generate the paths 172, the walking spaces 174, the obstacles 176, and the walls 178.

In various embodiments, the map inference application 160, the movement engine 162, the occlusion engine 164, and/or the wall engine 166 may estimate the dimensions of the user space and objects within the user space based on the tracking dataset 140 and/or the images 122 in conjunction with any amount of additional data. For instance, in some embodiments, the occlusion engine 164 estimates the size of an occluding object based on an "average human height" parameter (e.g., 5-6 feet). More precisely, the occlusion engine 154 estimates the size of the occluding object based on the portion of the partial skeleton 150 that is occluded by the occluding object and the average human height parameter.

The map inference application 160, the movement engine 162, the occlusion engine 164, and/or the wall engine 166 may or may not know the identity of different objects within the user space. In some embodiments, the map inference application 160, the movement engine 162, the occlusion engine 164, and the wall engine 166 do not receive any object identification information and do not perform any object identification operations. In various other embodiments, any number of the map inference application 160, the movement engine 162, the occlusion engine 164, and the wall engine 166 may perform any number and type of object identification operations based on the tracking dataset 140 and/or the images 122. For instance, in some embodiments, the map inference application 160 may perform image recognition operations on the images 122 to determine whether a moving object is an automatic vacuum cleaner.

In some embodiments, the map inference application 160 acquires additional information (e.g., new tracking dataset 140, new images 122, etc.) during the use of any number of previously generated models (e.g., the 2D walking space model 194, the 3D area model 192, etc.). The map inference application 160 can refine the map database 170 and update any number of the models based on the additional information.

Inferring Walking Paths and Obstacles

Figure 2:
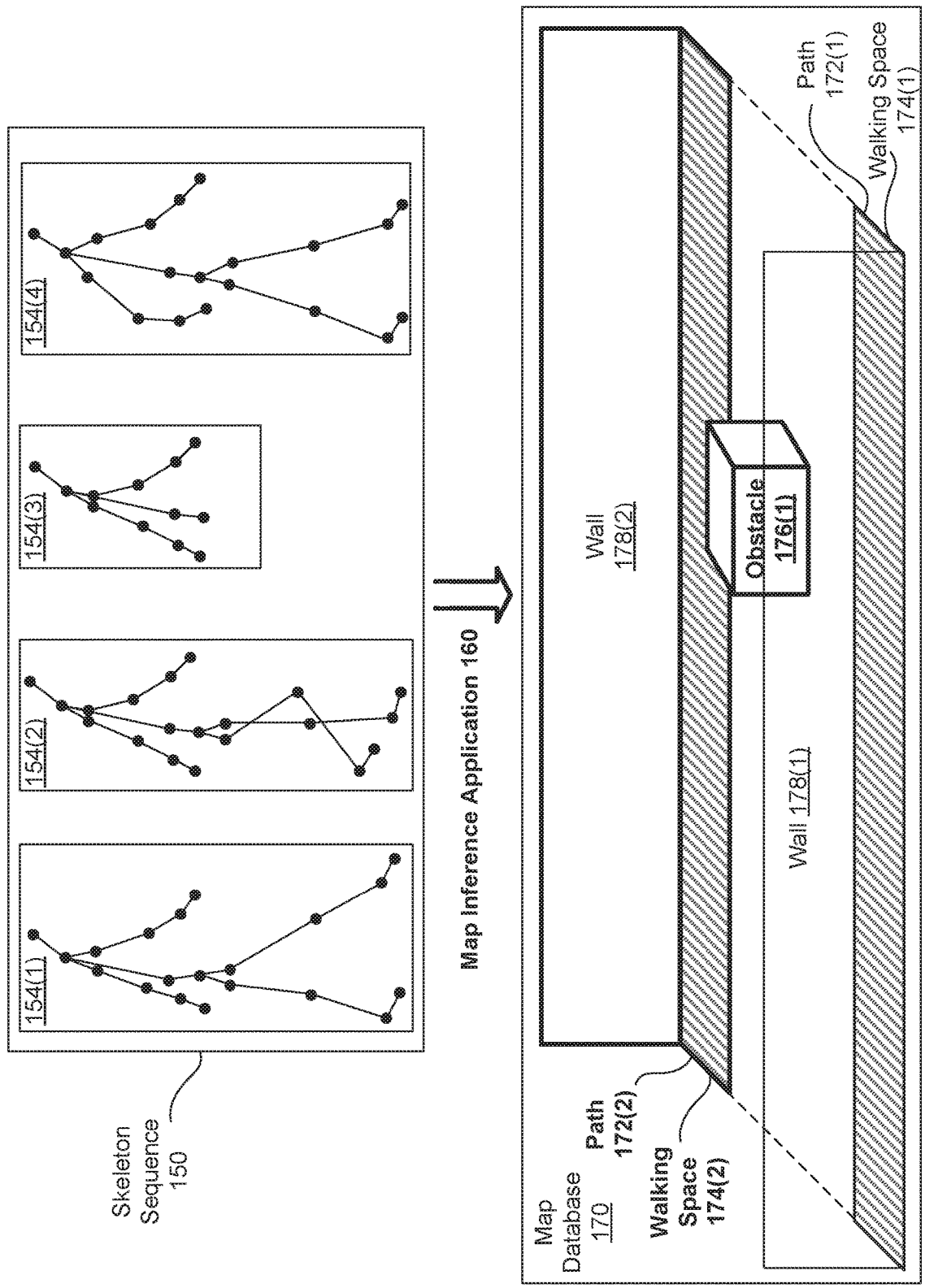
FIG. 2 is a more detailed illustration of the map database of FIG. 1, according to various embodiments of the present invention.

FIG. 2 is a more detailed illustration of the map database 170 of FIG. 1, according to various embodiments of the present invention 170. As shown, FIG. 2 depicts the map database 170 after the map inference application 160 processes the skeleton sequence 150 depicted in FIG. 2. Although not shown in FIG. 2, before the map inference application 160 processes the skeleton sequence 150, the map database 170 includes, without limitation, the path 172(1), the walking space 174(1), the "current front" wall 176(1) that is coincident with the front edge of the walking space 174(1), and the "current rear" wall 176(0) (not shown) that is coincident with the rear edge of the walking space 174(1). For explanatory purposes only, the modifications that the map inference application 160 makes to the map database 170 based on the skeleton sequence 150 are depicted in bold.

As shown, the skeleton sequence 150 includes, without limitation, the skeletons 154(1)-154(4), where each of the skeletons 154 represents the position of a moving person at a different time. Each of the skeletons 154 includes, without limitation, the joints 156(1)-156(20) that are depicted as solid circles. For explanatory purposes only, body parts arms, legs, torso, etc.) that are connected via the joints 156 are depicted as solid lines.

Based on the skeletons 154(1)-154(4), the movement engine 162 determines that a person moved within the tracked space from left to right and generates the path 172(2) to represent the movement of the person along the walking plane. The movement engine 162 then adds the path 172(2)

to the map database 170. Subsequently, the movement engine 162 determines that the path 172(2) is frequently traveled and generates the walking space 174(2) corresponding to the path 172(2). The movement engine 162 then adds the walking space 174(2) to the map database 170.

In general, the movement engine 162 may determine that a portion of the user space (e.g., the path 172, a portion of the path 172, etc) is frequently traveled in any technically feasible fashion. For instance, in one embodiment, to identify "frequently traveled" portions of the user space, the movement engine 162 determines which portions of the user space are within at least four of the paths 172. Subsequently, the movement engine 162 generates the walking spaces 174 that specify the frequently traveled portions of the user space.

Because the skeleton 154(3) is a partial skeleton that contains only the upper twelve of the twenty joints 156, the occlusion engine 164 determines that an object is positioned between the person represented by the skeleton 154(3) and the camera 120. The occlusion engine 164 computes the position and size of the occluding object based on the portion of the skeleton 154(3) that is occluded. Subsequently, the occlusion engine generates the obstacle 176(1) to represent the occluding object. The occlusion engine 164 then adds the obstacle 176(1) to the map database 170.

Notably, the walking space 174(2) is behind the current rear wall 178(0) that is coincident with the rear edge of the walking space 174(1). Consequently, the wall engine 166 generates a "new rear" wall 178(2) that is coincident with the rear edge of the walking space 174(2). The wall engine 166 then modifies the map database 170 to include the wall 178(2) instead of the wall 174(0). In this fashion, the wall engine 166 adjusts the size of the user space based on the movements of objects within the user space over time. By contrast, because the walking space 174(2) is behind the current front wall 178(1), the wall engine 166 does not remove the current front wall 178(1) from the map database 170.

Figure 3:
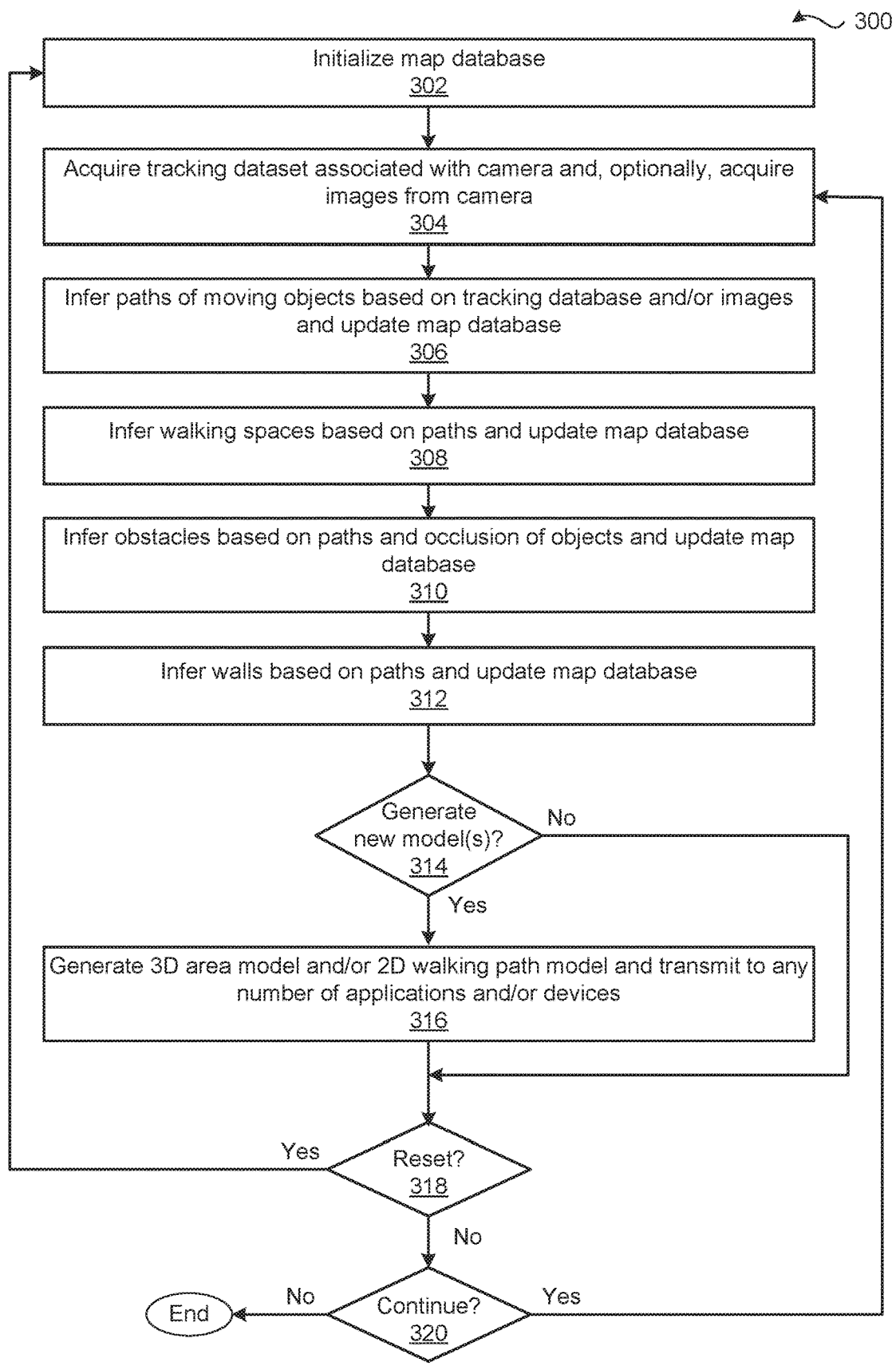
FIG. 3 is a flow diagram of method steps for automatically mapping a room, according to various embodiments of the present invention.

FIG. 3 is a flow diagram of method steps for automatically mapping a room, according to various embodiments of the present invention. Although the method steps are described with reference to the systems of FIGS. 1-2, persons skilled in the art will understand that any system configured to implement the method steps, in any order, falls within the scope of the present invention.

As shown, a method 300 begins at step 302, where the map inference application 160 initializes the map database 170. At step 304, the map inference application 160 acquires the tracking dataset 140 associated with the camera 120 and, optionally, acquires the images 122 from the camera 120. The map inference application 160 may acquire any type of tracking dataset 140 in any technically feasible fashion. For instance, in one embodiment, the tracking application 120 performs skeleton tracking operations to generate the tracking dataset 140 based on the images 122. Subsequently, the map inference application 160 receives the tracking dataset 140 from the tracking application 130.

At step 306, the movement engine 162 infers any number of the paths 172 of moving objects based on the tracking dataset 140 and/or the images 122 and then updates the mapping database 170 to reflect the paths 172. The movement engine 162 may infer the paths 172 in any technically feasible fashion. For instance, in one embodiment, the movement engine 162 determines the paths 172 based on the size and position of the skeletons 152 in the skeleton sequences 150 included in the tracking dataset 140.

At step 308, the movement engine 162 infers any number of the walking spaces 174 based on the paths 172 included in the tracking dataset 140 and then updates the mapping database 170 to reflect the walking spaces 174. The movement engine 162 may infer the walking spaces 174 in any technically feasible fashion. For instance, in one embodiment, the movement engine 162 selects areas that are frequently traversed by objects as per the paths 172 as the walking spaces 174.

At step 310, the map inference engine 160 infers any number of the obstacles 176 based on the paths 172 and/or occlusion(s) associated with moving objects and then updates the mapping database 170 to reflect the obstacles 176. More precisely, the movement engine 162 generates obstacles 174 corresponding to areas that are avoided by moving objects as per the paths 172. Further, for each occluded object included in the tracking dataset 140, the occlusion engine 164 generates a corresponding obstacle 176 based on the portion of the object that is occluded.

At step 312, the wall engine 166 generates or regenerates any number of the walls 178 based on paths 172 and then updates the mapping database 170 to reflect the walls 178. The wall engine 166 may generate the walls 178 in any technically feasible fashion. For instance, in one embodiment, the wall engine 166 generates the walls 178 based on the minimum area that encloses all the paths 172.

At step 314, the map inference application 160 determines whether to generate new model(s). The map inference application 160 may determine whether to generate new model(s) in any technically feasible fashion. For instance, in one embodiment, the map inference application 160 determines whether to generate new model(s) based on user input received via the user interface 180. If, at step 314, the map inference application 160 determines not to generate new model(s), then the method 300 proceeds directly to step 318.

If, however, at step 314, the map inference application 160 determines to generate new model(s), then the method 300 proceeds to step 316. At step 316, the map generator 190 generates the 3D area model 192 and/or the 2D walking path model 194 based on the map database 170. The map inference application 160 then transmits the 3D area model 192 and/or the 2D walking path model 194 to any number of software applications and/or devices.

Each of the software applications and/or devices may perform any number of operations based on the 3D area model 192 and/or the 2D walking path model 194. In one example, a gaming application could generate a virtual reality playing environment based on the 3D area model 192. In another example, an automated vacuum cleaner could perform navigation operations based on the 2D walking path model 194. In yet another example, an automatic dog toy could determine trajectories and accessible areas for launching balls based on the 3D area model 192.

At step 318, the map inference application 160 determines whether to reset the map database 170. The map inference application 160 may determine whether to reset the map database 170 in any technically feasible fashion. For instance, in one embodiment, the map inference application 160 determines whether to reset the map database 170 based on user input received via the user interface 180. If, at step 318, the map inference application 160 determines to reset the map database 170, then the method 300 returns to step 302, where the map interface application 160 (re)initializes the map database 170. If, however, at step 318, the map inference application 160 determines not to reset the map database 170, then the method 300 proceeds to step 320.

At step 320, the map inference application 160 determines whether to continue performing mapping operations. The map inference application 160 may determine whether to continue performing mapping operations in any technically feasible fashion. For instance, in one embodiment, the map inference application 160 determines whether to continue performing mapping operations based on user input received via the user interface 180.

If, at step 322, the map inference application 160 determines to continue performing mapping operations, then the method 300 returns to step 304, where the map interface application 160 acquires a new tracking dataset 140 and updates the map database 170 based on the new tracking dataset 140. In this fashion, the map inference application 160 improves the accuracy of the map database 170 over time. If, however, at step 322, the map inference application 160 determines not to continue performing mapping operations, then the method 300 terminates.

In sum, the disclosed techniques may be used to automatically generate a model of a room. In one embodiment, a map inference application acquires a tracking dataset generated based on images from a stationary camera located in a target room. The tracking dataset includes any number of skeleton sequences, where each skeleton sequence depicts the movement of a different object (e.g., a person, a dog, etc.). A movement engine included in the map inference application infers paths of moving objects along a walking plane based on the positions and sizes of the skeletons. Over time, the movement engine infers that paths frequently traversed by moving objects represent walking spaces. By contrast, the movement engine infers that areas typically avoided by moving objects represent obstacles.

An occlusion engine included in the map inference application infers the positions and sizes of additional obstacles based on occlusions of skeletons. For example, if a skeleton sequence includes a complete skeleton at four positions and only the upper portion of the skeleton at a fifth position, then the occlusion engine would infer that an obstacle is between the camera and the fifth position. A wall engine included in the map inference application infers the positions of walls based on the paths. Subsequently, a mapping generator generates a 3D room model and/or a 2D walking path model based on the walking spaces, the obstacles, and the walls.

At least one technical advantage of the disclosed techniques relative to the prior art is that the map inference application can automatically and efficiently generate models of a room based on images from a single stationary camera. Unlike prior art camera-based approaches to room mapping, with the map inference application, a person is not required to manually move a hand-held camera around the room. Consequently, the overall mapping process is less time-consuming and less susceptible to human error. Further, lesser amounts of computing resources are required to implement the disclosed techniques relative to the computing resources typically needed to implement prior art LIDAR-based approaches to room mapping. These technical advantages represent one or more technological advancements over the prior art approaches.

1. In some embodiments, a computer-implemented method for mapping a user space comprises determining a path of a first moving object within the user space based on a tracking dataset generated from images captured by a camera positioned within the user space; inferring a walking space within the user space based on the path; and generating a model of at least a portion of the user space based on the walking space, wherein one or more movements of a second object within the user space are based on the model.

2. The computer-implemented method of clause 1, wherein generating the model comprises inferring a location and a size of a third stationary object within the user space based on an occlusion associated with the first moving object; generating an obstacle based on the location and the size of the third stationary object; and representing a spatial relationship between the walking space and the obstacle in the model.

3. The computer-implemented method of clauses 1 or 2, wherein generating the model comprises inferring a wall based on the path; and representing the walking space as a horizontal surface area and the wall as a vertical surface area in the model.

4. The computer-implemented method of any of clauses 1-3, wherein the model comprises a three-dimensional (3D) model of the at least a portion of the user space or a two-dimensional (2D) model of at least a portion of the walking space.

5. The computer-implemented method of any of clauses 1-4, wherein the tracking dataset comprises a sequence of skeleton objects that represent the first moving object a different points in time.

6. The computer-implemented method of of any of clauses 1-5, wherein each skeleton object included in the sequence of skeleton objects comprises a plurality of positions for a plurality of joints.

7. The computer-implemented method of any of clauses 1-6, wherein the camera comprises a video camera or a still camera.

8. The computer-implemented method of any of clauses 1-7, further comprising performing one or more tracking operations on the images captured by the camera to generate the tracking dataset.

9. The computer-implemented method of any of clauses 1-8, wherein the first moving object comprises a person, and the tracking dataset comprises one or more sets of locations for one or more facial features associated with the person.

10. The computer-implemented method of any of clauses 1-9, wherein the second object comprises a person or an inanimate object.

11. In some embodiments, one or more non-transitory computer readable media include instructions that, when executed by one or more processors, cause the one or more processors to map a user space by performing the steps of determining a path of a first moving object within the user space based on a tracking dataset generated from images captured by a camera positioned within the user space; inferring a walking space within the user space based on the path; and generating a model of at least a portion of the user space based on the walking space, wherein one or more movements of a second object within the user space are based on the model.

12. The one or more non-transitory computer readable media of clause 11, wherein generating the model comprises detecting an occlusion of the first moving object based on a partial skeleton included in the tracking dataset; generating an obstacle based on the occlusion; and representing a spatial relationship between the walking space and the obstacle in the model.

13. The one or more non-transitory computer readable media of clauses 11 or 12, wherein generating the model comprises inferring a wall based on the path; and representing the walking space as a horizontal surface area and the wall as a vertical surface area in the model.

14. The one or more non-transitory computer readable media of any of clauses 11-13, wherein the model comprises a 3D model of the at least a portion of the user space or a 2D model of at least a portion of the walking space.

15. The one or more non-transitory computer readable media of any of clauses 11-14, wherein the tracking dataset comprises a sequence of skeleton objects that represent the first moving object a different points in time.

16. The one or more non-transitory computer readable media of any of clauses 11-15, wherein each skeleton object included in the sequence of skeleton objects comprises a plurality of positions for a plurality of joints.

17. The one or more non-transitory computer readable media of any of clauses 11-16, wherein the camera is at a fixed position and a fixed orientation within the user space.

18. The one or more non-transitory computer readable media of any of clauses 11-17, further comprising performing one or more tracking operations on the images captured by the camera to generate the tracking dataset.

19. The one or more non-transitory computer readable media of any of clauses 11-18, further comprising performing one or more facial recognition operations on the images captured by the camera to generate the tracking dataset.

20. In some embodiments, a system comprises one or more memories storing instructions; and one or more processors that are coupled to the one or more memories and, when executing the instructions, are configured to determine a path of a first moving object within the user space based on a tracking dataset generated from images captured by a camera positioned within the user space; infer a walking space within the user space based on the path; and generate a model of at least a portion of the user space based on the walking space, wherein one or more movements of a second object within the user space are based on the model.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for mapping a user space, comprising:
  determining a path of a first moving object within the user space based on one or more skeletons included in a skeleton sequence, wherein the skeleton sequence includes one or more two-dimensional (2D) coordinates for one or more joints, and wherein the skeleton sequence is generated from images that visually depict motion and are captured by a camera positioned within the user space;

inferring a walking space within the user space based on the path;
determining that at least one skeleton in the skeleton sequence is missing a first joint;
generating an obstacle within the user space based on the first joint; and
generating a model of at least a portion of the user space based on the walking space and the obstacle, wherein one or more movements of a second object within the user space are based on the model.

2. The computer-implemented method of claim 1, wherein generating the model comprises:
inferring a location and a size of a third stationary object within the user space based on an occlusion associated with the first moving object;
generating a second obstacle based on the location and the size of the third stationary object; and
representing a spatial relationship between the walking space and the second obstacle in the model.

3. The computer-implemented method of claim 1, wherein generating the model comprises:
inferring a wall based on the path; and
representing the walking space as a horizontal surface area and the wall as a vertical surface area in the model.

4. The computer-implemented method of claim 1, wherein the model comprises a three-dimensional (3D) model of the at least a portion of the user space or a 2D model of at least a portion of the walking space.

5. The computer-implemented method of claim 1, wherein the one or more skeletons represent the first moving object at different points in time.

6. The computer-implemented method of claim 1, wherein the one or more joints comprise a physical joint in a human skeleton.

7. The computer-implemented method of claim 1, wherein the camera comprises a video camera or a still camera.

8. The computer-implemented method of claim 1, further comprising performing one or more tracking operations on the images captured by the camera to generate the skeleton sequence.

9. The computer-implemented method of claim 1, wherein the first moving object comprises a person, and further comprising determining the path based on one or more sets of locations for one or more facial features associated with the person.

10. The computer-implemented method of claim 1, wherein the second object comprises a person or an inanimate object.

11. One or more non-transitory computer readable media including instructions that, when executed by one or more processors, cause the one or more processors to map a user space by performing the steps of:
determining a path of a first moving object within the user space based on one or more skeletons included in a skeleton sequence, wherein the skeleton sequence includes one or more two-dimensional (2D) coordinates for one or more joints, and wherein the skeleton sequence is generated from images that visually depict motion and are captured by a camera positioned within the user space;
inferring a walking space within the user space based on the path;
determining that at least one skeleton in the skeleton sequence is missing a first joint;
generating an obstacle within the user space based on the first joint; and
generating a model of at least a portion of the user space based on the walking space and the obstacle, wherein one or more movements of a second object within the user space are based on the model.

12. The one or more non-transitory computer readable media of claim 11, wherein generating the model comprises:
detecting an occlusion of the first moving object based on one or more missing joints associated with a partial skeleton included in the skeleton sequence;
generating a second obstacle based on the occlusion; and
representing a spatial relationship between the walking space and the second obstacle in the model.

13. The one or more non-transitory computer readable media of claim 11, wherein generating the model comprises:
inferring a wall based on the path; and
representing the walking space as a horizontal surface area and the wall as a vertical surface area in the model.

14. The one or more non-transitory computer readable media of claim 11, wherein the model comprises a 3D model of the at least a portion of the user space or a 2D model of at least a portion of the walking space.

15. The one or more non-transitory computer readable media of claim 11, wherein the skeleton sequence includes skeleton objects that represent the first moving object at different points in time.

16. The one or more non-transitory computer readable media of claim 15, wherein each skeleton object included in the skeleton sequence comprises a plurality of positions for a plurality of joints.

17. The one or more non-transitory computer readable media of claim 11, wherein the camera is at a fixed position and a fixed orientation within the user space.

18. The one or more non-transitory computer readable media of claim 11, further comprising performing one or more tracking operations on the images captured by the camera to generate the skeleton sequence.

19. The one or more non-transitory computer readable media of claim 11, further comprising performing one or more facial recognition operations on the images captured by the camera to generate one or more facial features associated with the first moving object.

20. A system, comprising:
one or more memories storing instructions; and
one or more processors that are coupled to the one or more memories and,
when executing the instructions, are configured to:
determine a path of a first moving object within a user space based on one or more skeletons included in a skeleton sequence, wherein the skeleton sequence includes one or more two-dimensional (2D) coordinates for one or more joints, and wherein the skeleton sequence is generated from images that visually depict motion and are captured by a camera positioned within the user space;
infer a walking space within the user space based on the path;
determine that at least one skeleton in the skeleton sequence is missing a first joint;
generate an obstacle within the user space based on the first joint; and
generate a model of at least a portion of the user space based on the walking space, wherein one or more movements of a second object within the user space are based on the model.

21. The computer-implemented method of claim 1, wherein determining the path of the first moving object within the user space is further based on a trajectory of the first moving object and a walking plane associated with the trajectory of the first moving object.

22. The computer-implemented method of claim 1, wherein the first joint is included in the one or more joints.

23. The computer-implemented method of claim 1, wherein determining that at least one skeleton in the skeleton sequence is missing the first joint comprises determining that a first skeleton in the skeleton sequence is a complete skeleton and a second skeleton in the skeleton sequence is a partial skeleton, and wherein the first joint is included in the first skeleton but is not included in the second skeleton.

* * * * *